Dec. 7, 1937.  A. M. CAMERON  2,101,129
CAN TESTER
Filed Feb. 24, 1936  3 Sheets-Sheet 2
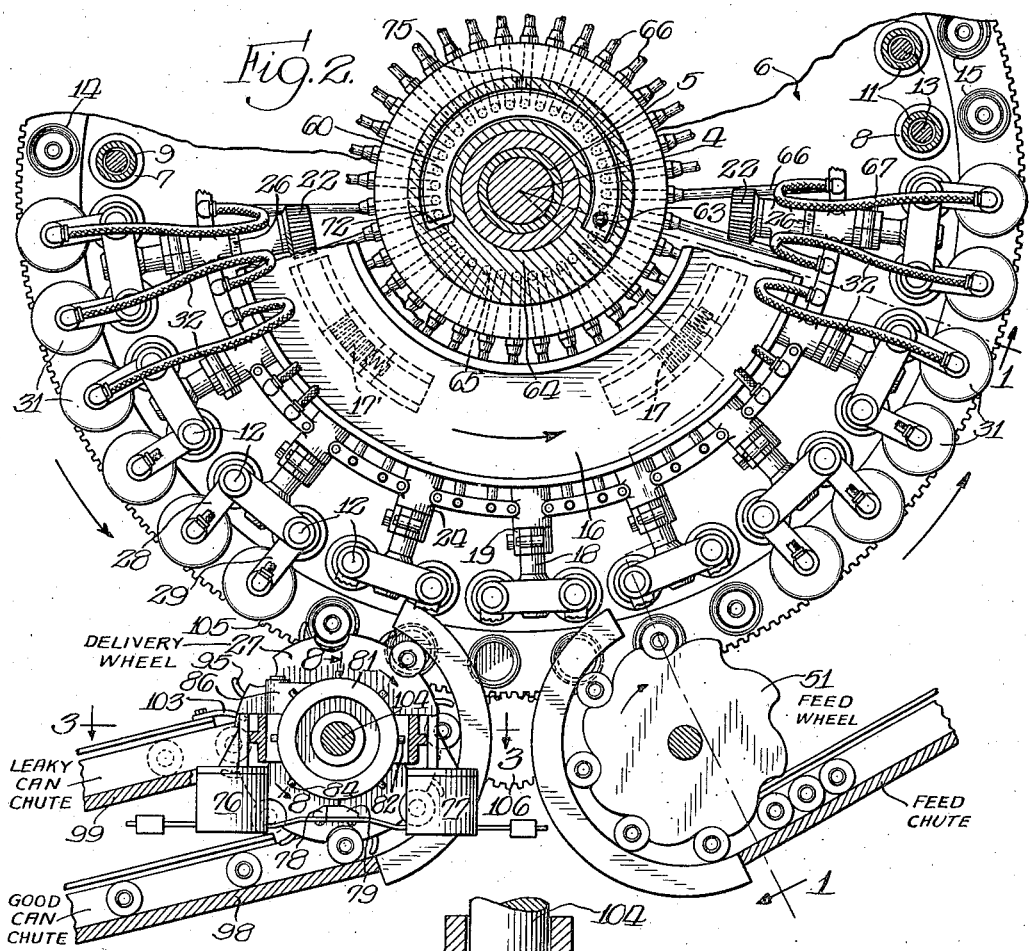
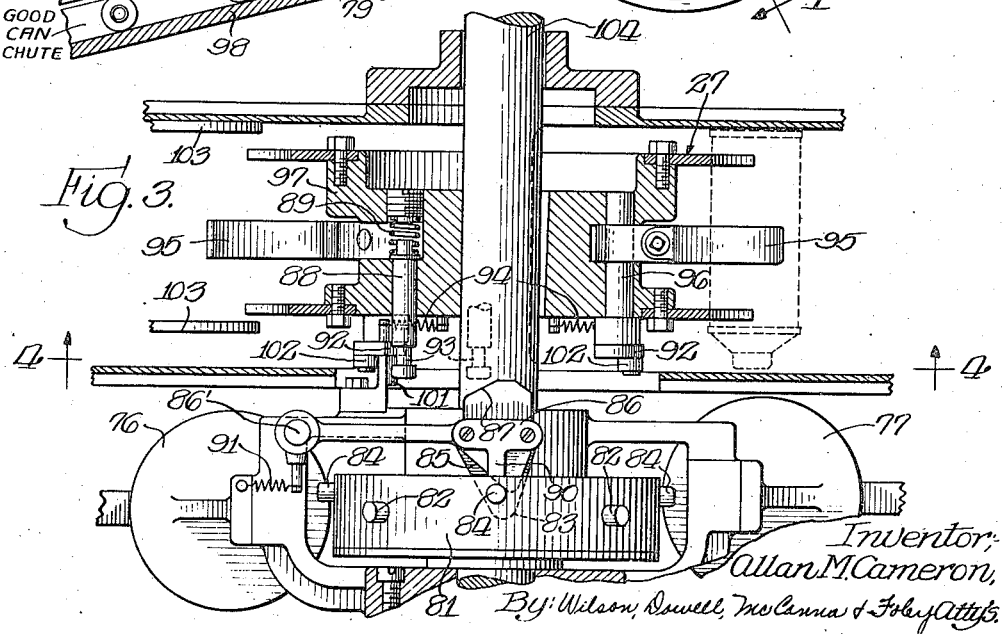

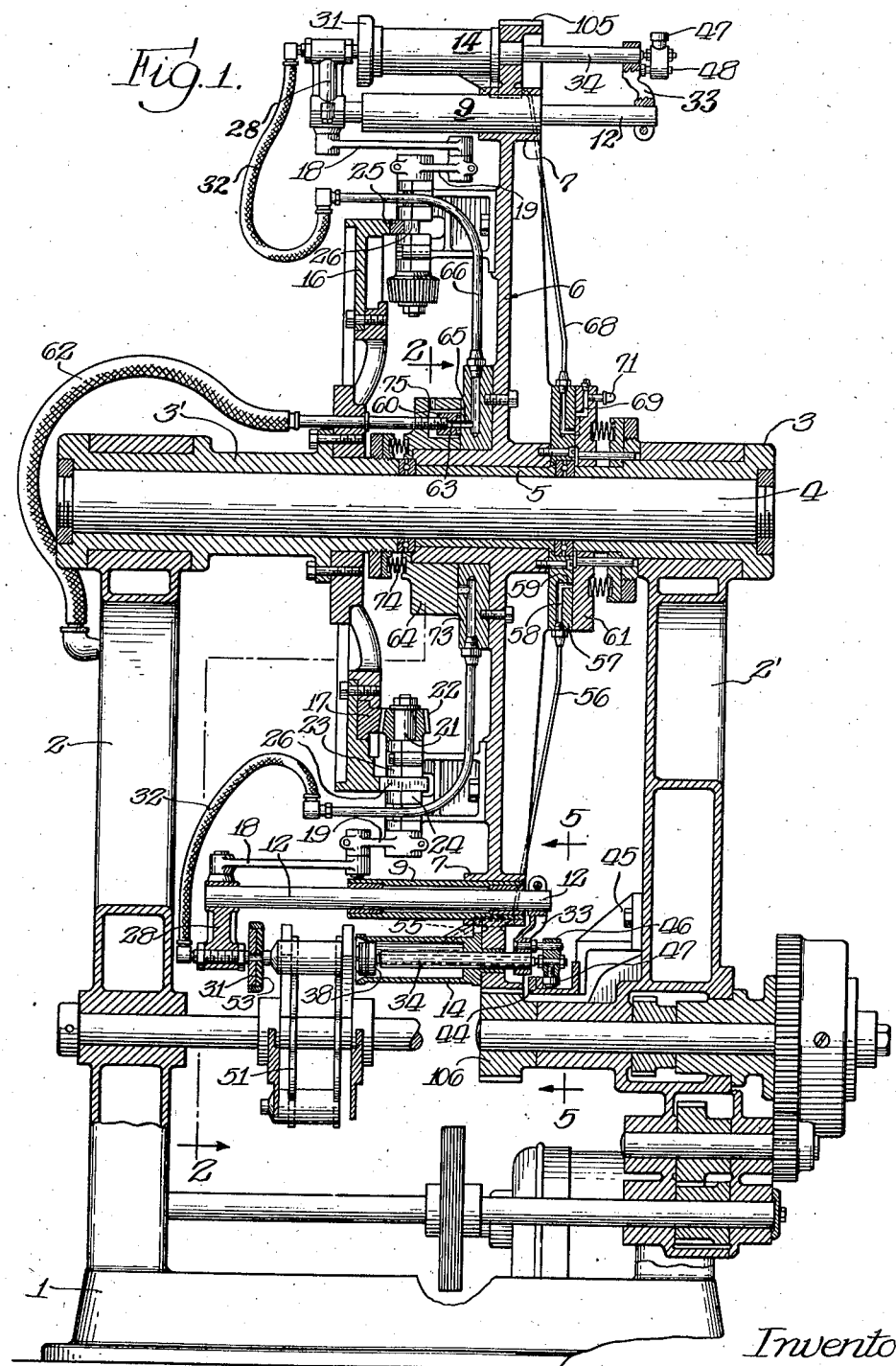

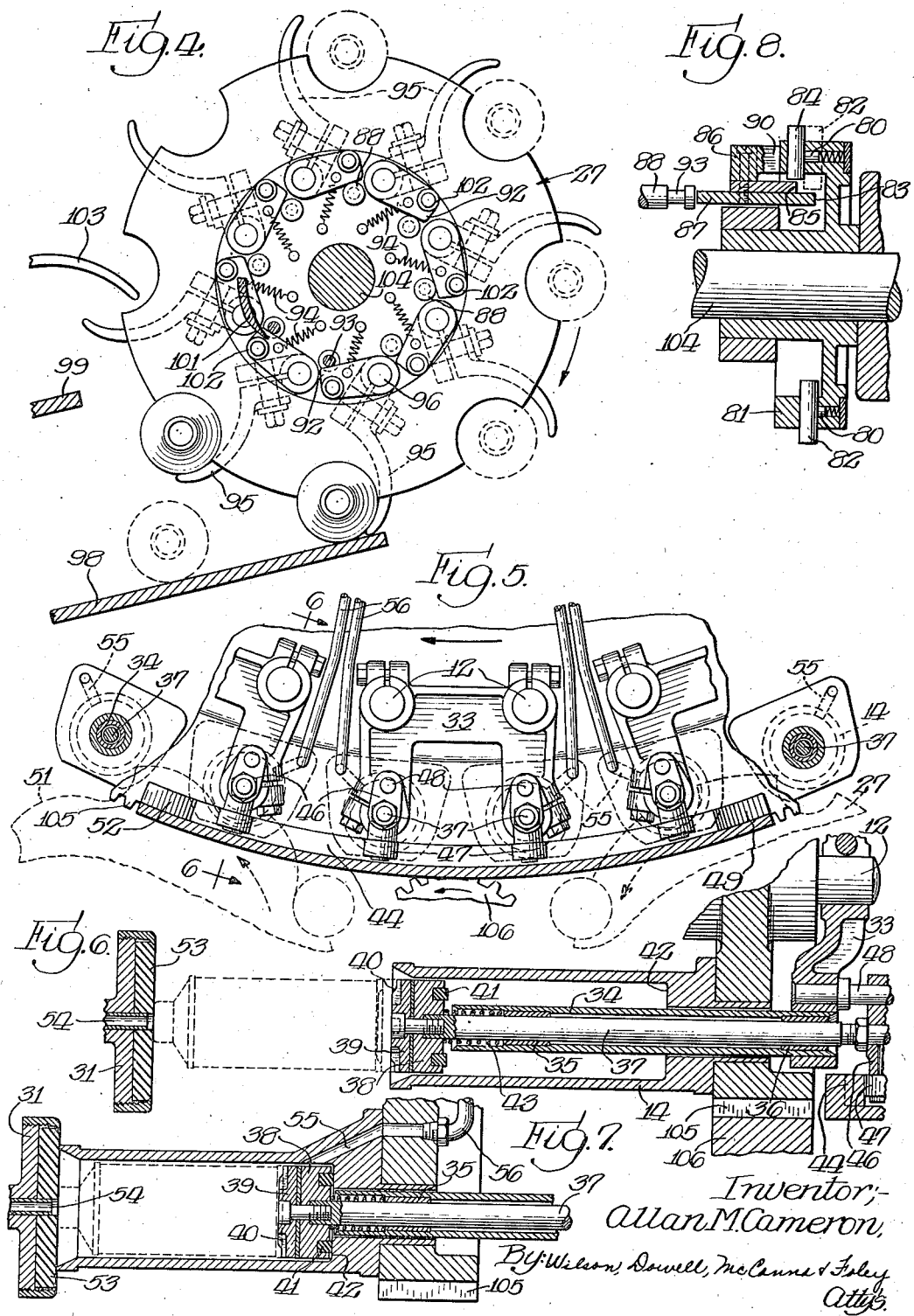

Patented Dec. 7, 1937

2,101,129

UNITED STATES PATENT OFFICE 2,101,129

CAN TESTER

Allan M. Cameron, Oak Park, Ill., assignor to Cameron Can Machinery Co., Chicago, Ill., a corporation of Illinois Application February 24, 1936, Serial No. 65,335

5 Claims. (Cl. 73—51)

This invention pertains to testing machines for testing can bodies to determine whether or not the bodies are leak-proof.

The apparatus in which the present invention is embodied and herewith illustrated resembles in some respects the testing machine covered by the William Cameron Patent No. 2,013,402, issued September 3, 1935, differing therefrom principally in that the present machine inserts the can bodies into the testing receptacles and withdraws them by mechanical means, whereas the machine of the prior patent employed pneumatic means for gripping the can bodies during insertion and withdrawal. Furthermore, the apparatus associated with the delivery wheel for selecting the leaky bodies to be dropped into a chute separate from the good bodies was operated in part pneumatically, while in the present invention this pneumatic feature is dispensed with.

The present invention, therefore, has for one of its general objects the provision of apparatus for accomplishing mechanical insertion and withdrawal of the can bodies with reference to the testing receptacles and mechanical means for separating the good from the leaky can bodies.

Other objects of the invention will be specifically alluded to in the description of the apparatus in which this invention is embodied.

Referring now to the drawings:

Fig. 1 is a sectional view through a machine embodying the invention on planes occupying substantially the position of the broken line 1—1 in Fig. 2;

Fig. 2 is a sectional view of a portion of the machine on planes lying in the broken line 2—2 of Fig. 1;

Fig. 3 is a horizontal sectional view on the plane of the line 3—3 of Fig. 2;

Fig. 4 is a view on the line 4—4 of Fig. 3;

Fig. 5 is a vertical sectional view on the line 5—5 of Fig. 1;

Fig. 6 is a sectional view on the line 6—6 of Fig. 5;

Fig. 7 is a sectional view through any testing receptacle of the machine after the same has been closed and a can is sealed therein; and Fig. 8 is a sectional view through a portion of the can separating apparatus.

Referring further to the drawings, the testing machine shown therein includes a base 1 from which rise standards 2 and 2' and on top of which are supported stationary tubular sleeves 3 and 3' surrounding shaft 4. Interposed between sleeves 3 and 3' is a bushing 5 secured to a testing wheel generally indicated as 6 on which is carried a plurality of testing receptacles into which the cans are inserted for the purpose of determining whether they are leak-proof.

The testing wheel provides supports at bearings, such as 7 for sleeves 9, the sleeves in turn providing a bearing in which rods, such as 12, may slide as the can bodies are being inserted into and withdrawn from the testing receptacles.

Also supported near the perimeter of the testing wheel are the testing receptacles, such as 14 (see Fig. 1). The lower receptacle 14 is shown as being located in registration with the top of the can body feed wheel, just ready to receive a can body, whereas the upper receptacle 14 is shown closed as when a can body is contained therein and being tested.

The apparatus for inserting and withdrawing the can bodies will now be described. Mounted stationarily on the stationary sleeve 3' is an arcuate member 16 supported in any suitable manner but preferably as shown in the drawings and carrying thereon two racks 17 and 17', which function at the proper time to cause can bodies to be inserted or withdrawn from the receptacles.

Associated with each testing receptacle is a rod, such as 12, reciprocating in a sleeve, such as 9, the rods being reciprocated in pairs by means of a link 18 connected to a crank 19, rigidly secured to a shaft 21. The shaft 21 is provided at one end with a bevel gear 22 which functions similarly to the corresponding apparatus in the William Cameron Patent No. 2,013,402, issued September 3, 1935, this gear meshing with the segmental racks 17 and 17' and being rotated thereby, as the testing wheel turns, at the positions where it is desired to produce motion of the can body inserting and withdrawing members. The shaft 21 is supported in bearings 23 and 24 carried on the face of the testing wheel. The stationary arcuate member 16 also carries on its perimeter a cam 25 which is shaped so that it will not contact the cam follower 26 when the associated gear is in mesh with either rack 17 or rack 17', but when any gear 22 is not in mesh with either of the racks a flat face of the cam follower 26 on such shaft 21 will slide along the stationary cam 25 and hold the shaft in whatever position it then occupies. Hence, if a can inserting mechanism is retracted from its receptacle it will be held in that position as the receptacle progresses from the delivery wheel over to the feed wheel. The above mentioned Cameron Patent No. 2,013,402 may be referred to for further information on this feature of the apparatus, Fig. 12 of said patent showing the shaft in the act of being rotated by means of one of the racks.

Can bodies are inserted into and withdrawn from testing receptacles in pairs and as each pair of receptacles approaches the delivery turret 27 the associated bevel gear 22 will be rotated by the rack 17' to rotate the shaft 21 through 180°, thus imparting motion to the crank 19 and link 18 to slide the rod 12 to the left, as Fig. 1 is viewed. Fixed upon the outer end of each pair of rods 12 is a bracket 28 each of which supports a head or plate 31. Since each of these plates is to be brought into contact with the open end of a can body, the face which contacts the can body is appropriately composed of a layer of rubber or some other suitable yieldable material adapted to cooperate in forming a yielding but leak-proof contact with the mouth of the can body. Each bracket 28 and its associated head plate is provided with a passage to which a flexible tube 32 is connected for the purpose of introducing, preferably, compressed air to the interior of each can body. For testing purposes, a vacuum could be impressed upon the can body interior but compressed air is preferred at present.

The opposite ends of each pair of reciprocating rods 12 carry another bracket 33 which supports the outer ends of a pair of sleeves 34.

Referring now to Figs. 1, 6 and 7 in particular, each sleeve 34 is provided with bearing members 35 and 36 which guide a rod 37 adapted to reciprocate within the hollow sleeve. Rigidly secured upon one end of the rod 37 is the inner head 38 for gripping the can bodies. The inner head carries on its outer face a plate 39 which is provided with radial ribs 40 adapted to afford a substantial support for the bottom of a can body without producing a vacuum adherence between the bottom and the plate. A rubber ring 41, particularly shown in Figs. 6 and 7, is provided for the purpose of contacting the inner end wall 42 of the testing receptacle when the can body is fully inserted thereinto, thus providing a seal to prevent the escape of air from the receptacle around the sleeve 34.

As both the brackets 33 and 28 on opposite ends of each rod 12 are rigidly secured thereto, means must be provided for causing the outer head 31 and the inner head 38 to approach each other to tightly grip a can body or to recede from each other to release a can body. Accordingly, the rod 37 is arranged so that it may reciprocate a slight amount inside of the hollow sleeve 34. A spring 43 rests against the bearing 35 and the inner head 38 constantly urging the rod 37 toward the outer head 31. After a can body has been gripped between the inner and outer head plates, the spring 43 causes the inner head to yieldingly thrust against the bottom of the can body. In order that a can body may be released from between the two head plates in order to be picked up by the delivery wheel of the testing machine, a cam 44 is provided and stationarily mounted on the frame of the machine, preferably by means of the bracket 45 supported upon the standard 2'.

The outer end of each rod 37 has fixed thereon a member 46 which carries a cam follower or roller 47. A dowel pin 48 is provided, as shown in Fig. 6, to maintain the proper radial position of the cam follower while permitting the member 46 to reciprocate freely with the rod 37. Just before each pair of testing receptacles approaches the delivery wheel 27, the rack 17' will cause the associated lever 18 to move the rods 12 outwardly, carrying therewith the inner and outer heads which are then gripping each can body carried by each receptacle. Shortly thereafter as the first of each pair of receptacles more closely approaches the delivery wheel, its associated cam follower 47 will ride up the inclined surface 49 of the stationary cam 44 and cause the associated rod 37 to be withdrawn slightly inwardly toward the interior of the receptacle. This slight movement will, of course, be accomplished against the action of the spring 43 while the sleeve 34, however, remains stationary. This slight withdrawal of the inner head 38 will be sufficient to release the can body which is immediately received into the delivery wheel 27 and disposed of in a manner hereinafter described. As the second receptacle of each pair then approaches the feed wheel, its cam follower 47 will cause the same action to take place. As each testing receptacle moves from the delivery wheel toward the feed wheel to receive a new can to be tested, the cam 44 will cause the inner head 38 to be retained in a slightly withdrawn position, leaving ample space for a new can body to be inserted by the feed wheel between the two can gripping heads. Without further explanation it will readily be understood that as the feed wheel 51 brings a can body into position between each pair of head plates associated with each receptacle, the cam follower 47 associated therewith will then roll down the reversely inclined slope 52 at the end of the cam 44 and allow the spring 43 to urge the inner head plate 38 slightly outwardly to firmly thrust the can body up against the outer head plate.

After each pair of receptacles has thus been supplied with can bodies to be tested and the can bodies are gripped in the manner just described, the segmental rack 17 will cause the can bodies to be inserted into their respective receptacles.

Referring now to Fig. 7, it will be observed that when each can body is fully inserted into its receptacle the outer head plate having a yieldable surface member 53 will not only provide a leak-proof contact with the mouth of the can body, but will simultaneously seal the open end of the testing receptacle. At the same time the sealing ring 41 will seal the perforated bottom of the testing receptacle and make the receptacle ready for the beginning of the pneumatic test. As mentioned before, this test is accomplished preferably by delivering compressed air through a passage 54 into the can interior. If any leakage occurs, it will necessarily change the pressure of the receptacle interior surrounding the can body and this change is utilized for indicating the existence of a leak and for operating the selector apparatus which separates good can bodies from leaky can bodies.

The testing of the cans for leaks is accomplished as follows: After cans are inserted into the pairs of receptacles, as previously described, the testing wheel moves such pair of receptacles further away from the feed wheel and the rack 17 becomes engaged by the bevel gear associated with such pair of receptacles, and thereupon the receptacles become closed and sealed. It is necessary, of course, to make certain that atmospheric pressure exists in the receptacle surrounding the can body before the test starts, hence this is provided in the following manner. From each testing receptacle there leads a passage 55 communicating with a tube 56 leading into the valve plate 57 which rotates with the testing wheel. A radially disposed passage 58 in this plate communicating with a transverse passage 59 will establish communication with the atmosphere at the time the can body is sealed in the testing receptacle and for an instant thereafter. For a better understanding of this feature the William Cameron Patent No. 2,020,535 may be consulted, reference being had particularly to Figs. 4 and 6 of the prior patent. After atmospheric pressure has been established in the testing receptacle, the rotation of the testing wheel causes the movable valve plate 57 to rotate further with reference to the stationary valve plate 61 until the passage 59 and tube 56 become sealed. Thereafter compressed air will be supplied to the can body interior to test the can for leakage. A tube 62 connected with any suitable source of compressed air communicates, as shown, with a passage 63 in an arcuate shoe 60 forming part of a stationary plate valve 64. Whenever any passage, such as the passage 65, comes into registration with the passage 63, it will then admit compressed air through its associated tube 66 and 32 into a can body sealed in a testing receptacle. The compressed air is supplied for this test preferably at the position shown by the upper branch of the line 1—1 in Fig. 2. As soon as the can body is charged, however, the compressed air is cut off therefrom as the passage 65 rotates away from the passage 63. The passage 65 associated with each can body then under test will slide along a solid wall of the valve plate 64 during the entire extent of the testing period. In the meantime if there be a leak in the can body some of this compressed air will escape into the testing receptacle and thence through the associated tube 56 or 68 and, when the leaky can body has been rotated by the testing wheel sufficiently far, this tube will then communicate with the passage 69 and a pipe 71 leading to a testing diaphragm of any suitable construction capable of causing a circuit to be closed to operate a solenoid. A diaphragm of the character shown in Fig. 9 of the William Cameron Patent No. 2,020,535 is preferred, there being a pair of diaphragms in the unit, one being provided for each of a pair of testing receptacles.

It may be here stated that after the increased pressure in the testing receptacle, due to a leaky can body, has been transmitted through the valve plates 57 and 61 and tube 71 to a testing diaphragm, the compressed air still remaining in the can body will be released by causing the associated tubes 32, 66 and passage 65 to come into registration with an aperture in the stationary valve plate 64 leading to atmosphere. Referring to Fig. 2, it will be observed that the arcuate shoe 60 has only the one aperture 63 therein and is imperforate throughout the rest of its extent where the tubes connected with cans under test slide thereover. However, after each can has been tested and the leakage resulting therefrom, if any, has been communicated to a testing diaphragm, the passage 65 connected with the can will move into registration with the gap 72 at the end of the arcuate shoe, thus releasing compressed air from the can interior.

It should be understood, of course, that the valve plate 73 rotates with the testing wheel and is provided with a passage corresponding to the passage 65 for every testing receptacle, but that there is only one passage 63 for supplying compressed air to these passages 65 as they come into registration therewith. The stationary valve plate 64 is yieldably held against the movable valve plate 73 by means of a plurality of springs such as 74. A passage 75 establishes communication to the atmosphere with the gap 72 to provide for the escape of compressed air from the can bodies as they successively come into communication therewith. This part of the apparatus, however, is similar in construction and operation to the valve structure of the William Cameron Patent No. 2,013,403, issued September 3, 1935.

Assuming that a double diaphragm be employed in connection with this apparatus, similar to the double diaphragm shown in Fig. 9 of the William Cameron Patent No. 2,020,535, and that the valve plates 57 and 61 are similar to valve plates 139 and 141 in the same prior patent, should a leak occur in a can body under test, the resultant pressure created in the receptacle will distend the diaphragm with which that receptacle becomes connected at the proper point in the rotation of the testing wheel, a circuit will be closed through either the solenoid 76 or 77, depending upon which diaphragm was distended and either the shoe 78 or 79 supported on the armatures of the solenoids 76 and 77 respectively will be drawn inwardly where it may be contacted by one of the radially extending pins on the drum 81.

For illustrative purposes, the apparatus for separating the leaky can bodies from the good ones is shown connected to a delivery wheel 27 having eight receiving pockets and there are accordingly eight slidable pins 82 and 84 disposed four in each of two rows, staggered as shown, one row of the pins being arranged to engage one of the armature shoes and the other row of pins to engage the other armature shoe. This drum and its reciprocating pins constitute an assembly similar in construction and operation to the corresponding assembly in the prior Cameron Patent No. 2,013,402, each of the pins being frictionally held in the drum by a spring loaded pin 80 resting against its side, as shown in Fig. 8 and in the prior patent. The entire mechanism is so arranged that when a solenoid is operated by a leaky can, the proper pin will be depressed to cause the separation of that can from the good cans when it has been received into the delivery wheel. If a pin, such as 82, in one row is pushed inwardly by the action of a solenoid, the inner end of the pin will, as it rotates with the delivery wheel, strike the dog 83 swinging the same upwardly, as Fig. 3 is viewed, but actually horizontally in the machine. Should a pin, such as 84, in the other row be depressed, it will strike against the other dog 85. These dogs are rigidly secured to an arm 86 pivotally mounted at 86'. The pins, such as 84, are shorter than the pins 82, hence the longer dog 83 may pass underneath them to be in position to be engaged by any of the pins 82 which happen to be pushed inwardly. When the arm 86 is pushed outwardly by the action of a depressed pin, the cam 87 thereon will strike against a lock pin such as 88 and push the same inwardly against the action of its spring 89. A spring 91 will restore the arm 86 to its normal position with the stop member 90 abutting the side of the drum 81.

As any of the lock pins, such as 88, is forced inwardly by the cam 87, a dog 92 which normally rests against the side of the pin 88 where its diameter is larger, will be enabled to swing into the reduced portion 93 of the pin, under the action of the spring 94 and as it swings inwardly toward the center of the pin it will cause the associated finger 95 also to swing in the same direction about the axis 96, this being the center of a rotatable pivot pin carried on the hub 97 of the delivery wheel, the dog and finger both being rigidly secured thereto to rotate in unison. The rotation of any finger made possible by the associated pin 88 moving inwardly far enough to permit the dog to swing into its reduced portion will be sufficient to bring the finger into contact with the adjoining can body then lying in a pocket of the delivery wheel and carry the same beyond the chute 98 for good can bodies upwardly into the higher chute 99 for leaky can bodies. The pin and associated finger will, of course, be caused to operate if the previous testing of the particular can body has proved it to be a leaky one, but if the can body was found to be good, the finger will not swing into contact with it and it will be permitted to roll down the chute for good can bodies.

As the delivery turret revolves and carries a leaky can body upwardly toward the chute for leaky cans a stationary cam 101 disposed on the stationary part of the frame will engage a roller 102 on the dog which has been previously allowed to swing inwardly and will cause the same to move slowly outwardly gradually releasing the dog from engagement from the reduced portion 93 of the pin 88, and when full release has been accomplished the pin 88 will be pushed outwardly to its normal position by its spring 89. At the same time the finger 95 will be sufficiently withdrawn from the can body so that the can body may be ejected from the delivery turret into the leaky can chute by a pair of fingers 103.

To prevent the head 38 from moving too far to the left as Fig. 6 is viewed, should the feed wheel not present a can to be gripped, the yoke 46 may be allowed to bump against the enlarged portion of the pin 48.

A free passage for flow of air into and out of the testing chamber behind the head 38 is provided alongside of the tubular member 36, through the chamber bottom.

It will, of course, be understood that the shaft 104 drives both the delivery wheel and the drum 81 in unison and that both the delivery wheel and feed wheel are driven in timed relationship with the testing wheel to produce the desired synchronization of movements. The testing wheel has a ring gear 105 on its periphery which is driven by a pinion 106 and the delivery and feed wheels are connected by gears to be driven in synchronization therewith.

It should be understood that the drawings and specification illustrate particularly merely one form of the invention and that the scope of this invention is such that various modifications thereof may be devised which will, nevertheless, employ the principles of the invention without departing from the scope of the appended claims.

Having shown and described my invention, I claim:

1. In a can testing machine, the combination of a testing wheel carrying a plurality of testing receptacles, a delivery wheel provided with a plurality of pockets for receiving cans from said wheel, a defective can chute and a good can chute associated with said delivery wheel, means including can engaging fingers carried by said delivery wheel for mechanically gripping defective cans to carry them past the good can chute to the defective can chute, and means controlled by the tested cans for actuating said fingers, said last mentioned means including a dog movable with each finger, a spring pressed lock pin controlling the position of each dog and finger and having a recess for the reception of said dog and means for actuating said pin relatively to said dog.

2. In a can testing machine, the combination of a carrier for the bodies to be tested, a delivery turret constructed to receive tested bodies from said carrier, a pair of delivery chutes positioned to receive bodies from said turret, a plurality of body holding devices pivotally mounted on said turret, means for detecting defective bodies on said carrier, and mechanism controlled by said detecting means for varying the position of said body holding devices to thereby cause the delivery from said turret of the good bodies to one of said chutes and of the defective bodies to the other chute, said mechanism including dogs pivotally movable with said devices, locking pins controlling said dogs and a pivotally mounted arm for actuating said pins.

3. In a can testing machine, the combination of a carrier for the bodies to be tested, a delivery turret provided with pockets to receive tested bodies from said carrier, a pair of delivery chutes, a body holding device pivoted on said turret in cooperative relation with each of said pockets, means for detecting defective bodies on said carrier, and means controlled by said detecting means for actuating said holding device to hold defective bodies in their respective pockets while permitting the delivery of good bodies therefrom, said means including locking pins and control dogs mounted on the turret, an arm in proximity to the path of travel of said pins and means rendered operative by a defective body to actuate said arm.

4. In a can testing machine, the combination of a carrier for the bodies to be tested, a delivery turret provided with a plurality of pockets to receive tested bodies from said carrier, a pair of delivery chutes, a body holding device pivotally mounted on said turret in proximity to each turret pocket, springs for urging said holding devices into a position to retain can bodies in said pockets, locking pins slidably mounted on the turret for normally retaining said holding devices in inoperative position, means mounted adjacent to the turret in proximity to the path of travel of said locking pins for sliding said pins into position to release said holding devices and permit the same to assume a can body holding position, means rendered operative by a defective tested body for actuating said last-mentioned means whereby a defective body is retained in the turret and prevented from being delivered into the good can chute, and means for retracting said holding devices to permit the delivery of said defective can bodies into the other chute.

5. A can body testing machine comprising a plurality of testing receptacles, can body introducing and ejecting means associated with each receptacle including a pair of heads reciprocable as a unit relatively to such receptacle, one of said heads being adapted to seal the open end of the receptacle, means for introducing air under pressure into a can body in said receptacle through said last-mentioned means, a tube reciprocable through the bottom of each receptacle, a rod projecting through said tube and secured at one end to the inner one of said heads, a spring interposed between said last-mentioned head and an abutment in said tube whereby said member is yieldably urged away from said tube, a cam follower carried by the outer end of said rod, and a cam cooperable with said follower to reciprocate said tube and rod, said cam being adapted to retract the head carried by said rod against the force of said spring to permit the discharge of a can body from between said heads.

ALLAN M. CAMERON.